United States Patent [19]

Pappanikolaou

[11] Patent Number: 4,765,643
[45] Date of Patent: Aug. 23, 1988

[54] FOLDING CART

[76] Inventor: Sofia Pappanikolaou, 621 90th St., Brooklyn, N.Y. 11228

[21] Appl. No.: 14,773

[22] Filed: Feb. 13, 1987

[51] Int. Cl.⁴ ............................................... B62B 3/02
[52] U.S. Cl. .................................. 240/639; 280/43.16; 280/4737 R
[58] Field of Search .................. 280/35, 638, 639, 37, 280/39, 43.16, 47.17, 47.18, 47.37 R, 43, 651, 659

[56] References Cited

U.S. PATENT DOCUMENTS

| | | | |
|---|---|---|---|
| 1,180,327 | 4/1916 | Simpson | 280/638 |
| 3,488,062 | 1/1970 | Walda | 280/43 |
| 3,762,739 | 10/1973 | Tabet | 280/47.37 R |
| 4,310,166 | 1/1982 | Eicher | 280/4737 R |

*Primary Examiner*—John J. Love
*Assistant Examiner*—Richard Camby

[57] ABSTRACT

A folding cart, unique in that it can be made small and light enough to be hand carried, yet when unfolded, to have the advantages of a large cart using four wheel assemblies that swivel.

9 Claims, 6 Drawing Sheets

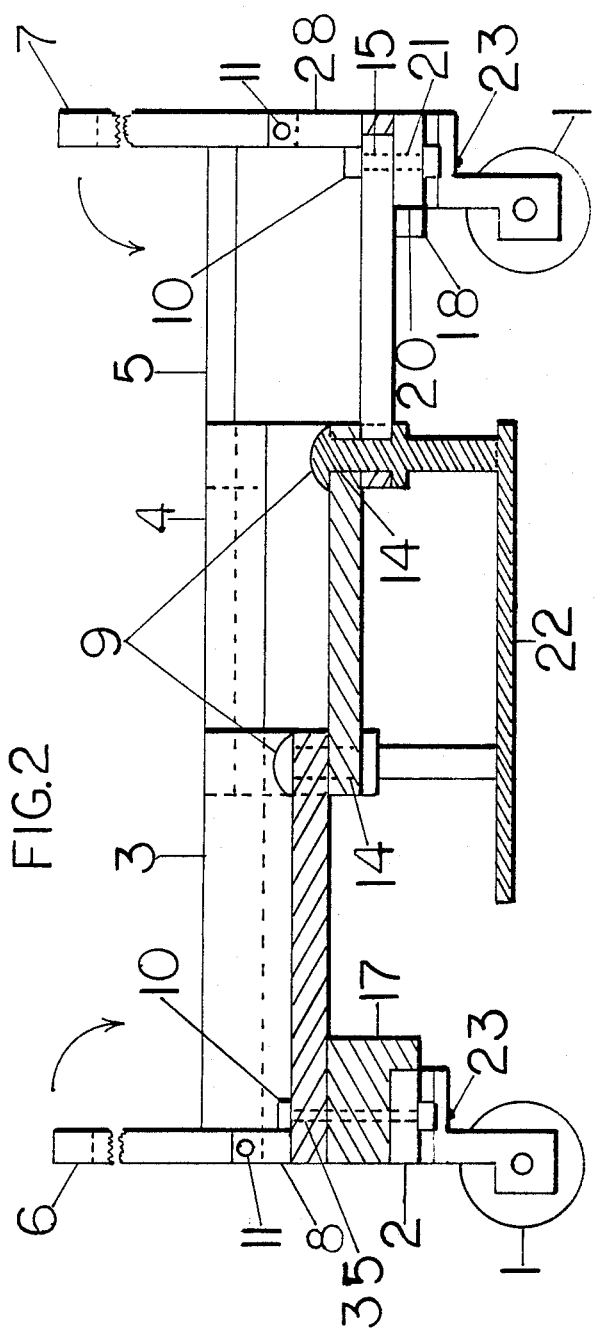
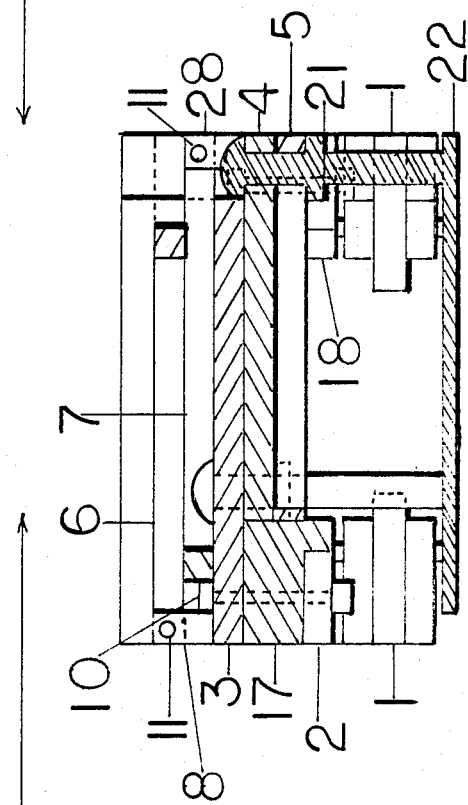

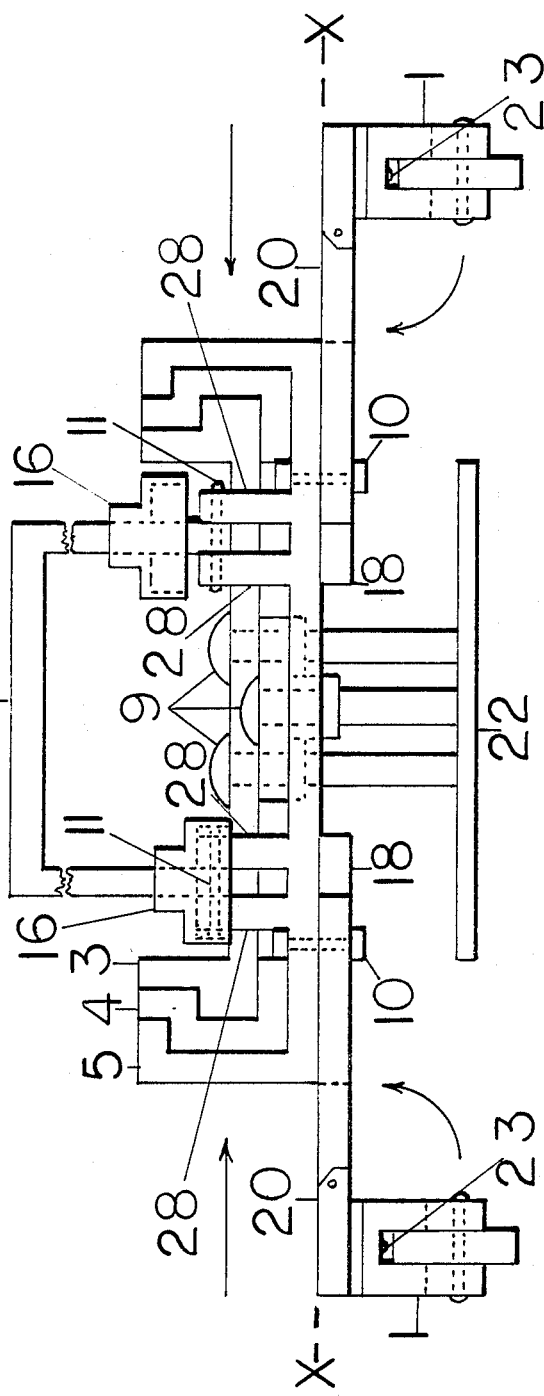

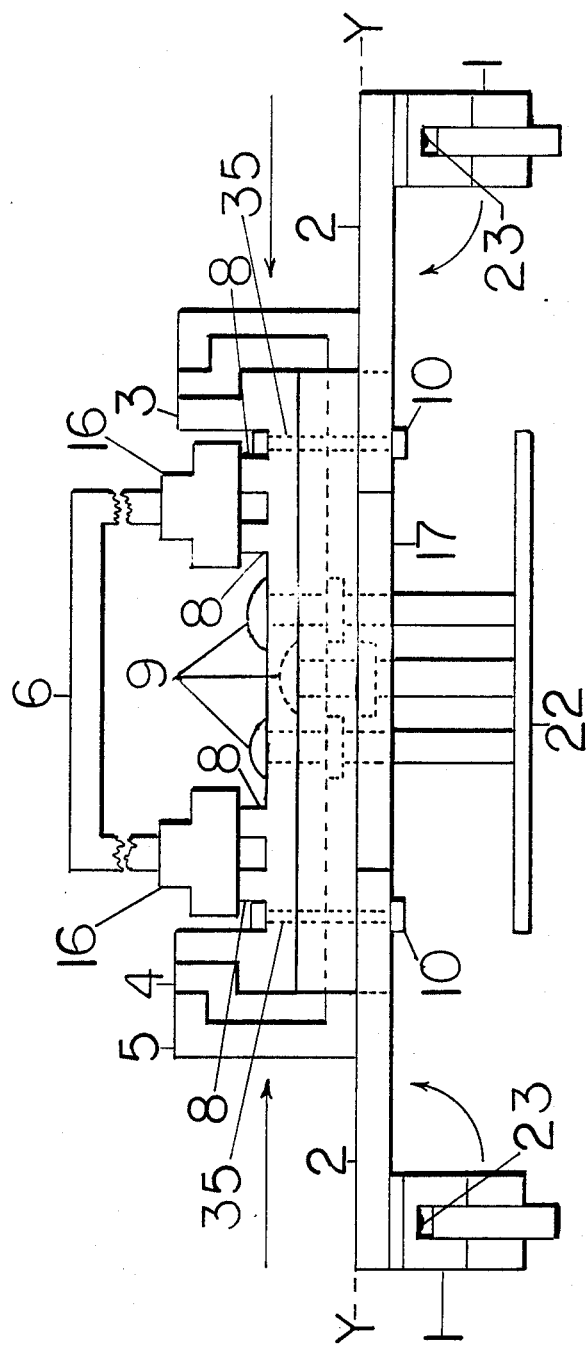
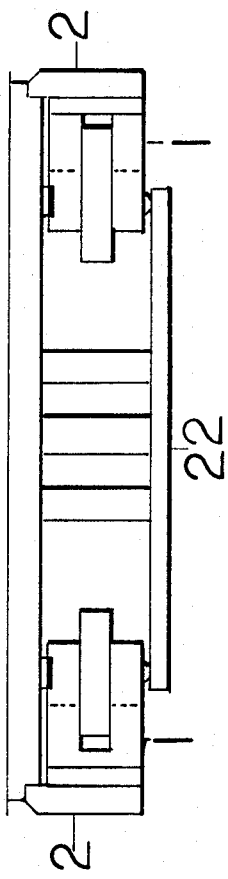
FIG.6
FIG.7

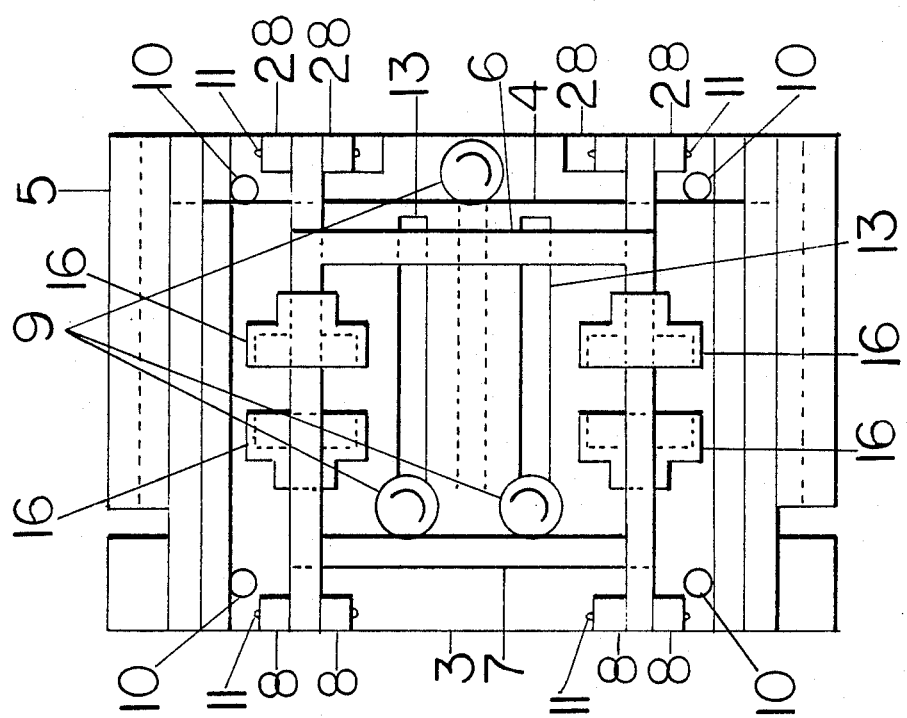
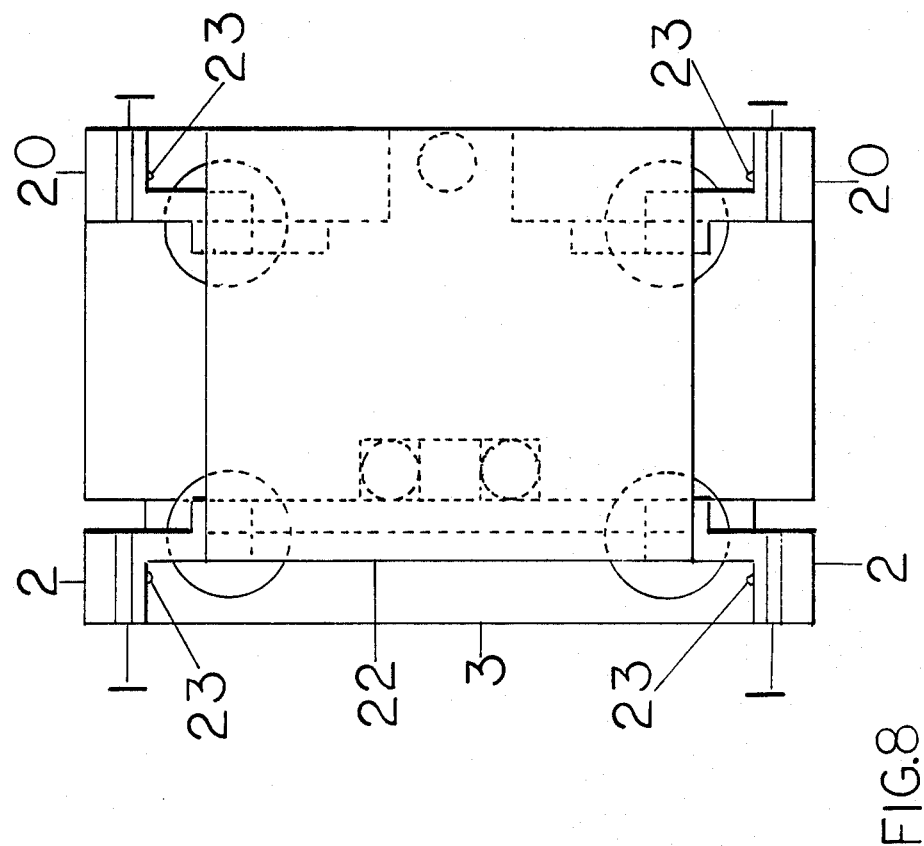
FIG.9
FIG.8

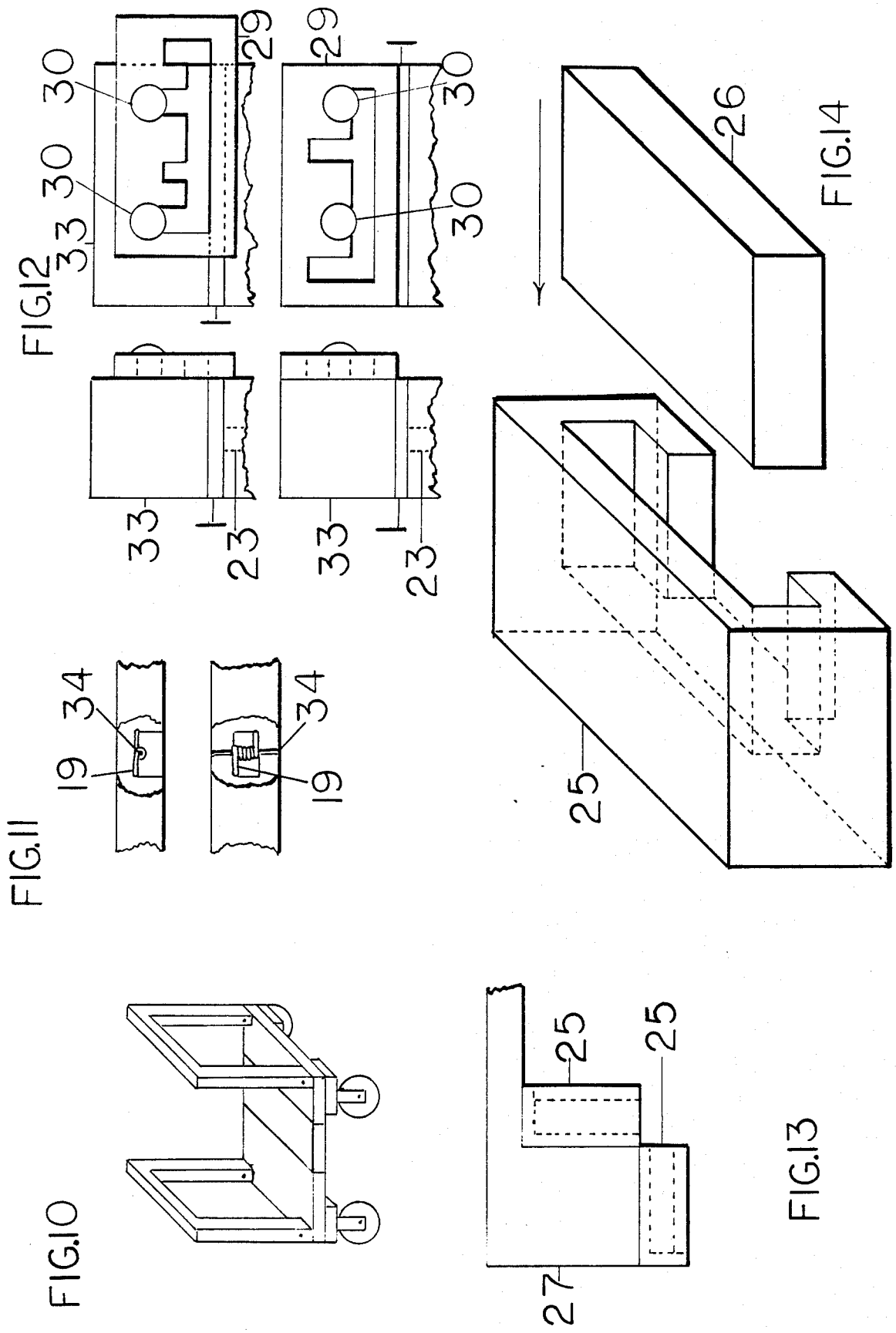

FOLDING CART

BACKGROUND OF THE INVENTION

There are basically two types of folding carts on the market today.

One type is represented by U.S. Pat. No. 4,411,343. It is essentially a device that opens into an "L" shaped body, 8" to 12" wide, with the longer part of the "L" being the handle by which the cart is pulled, and the shorter part of the "L" being the load platform. A wheel is placed approximately at each end of the right angle junction of the "L".

The advantage of this design is that it can be made compact, yet be able to accomodate large packages, since it has no sides. However, there are also several disadvantages.

Ideally, the best type of load for this cart, would be a small cube of uniform density, tht would sit at the junction of the "L", and balance on the cart, so that it is stable, and there is no tendency for the cart to rotate on its wheel axis.

As a practical matter, almost all loads are rectangular in shape, with one dimension being significantly much larger; such as suitcases, which are almost always not of uniform density. This requires that the load must be balanced on the 8" to 12" wide junction of the "L", so that the load doesn't slide off the cart.

Even if the load is perfectly balanced, any bump or hole in the ground, or any slight deviation of the ground from being flat and level, because of the small distance between wheels, can cause the cart to tilt, and the load to slide off, especially when making a turn with the cart.

If the load is tied to the cart, the whole cart may tip over.

Another problem with the fact that the load doesn't balance on the cart, is that the cart when being pulled is unstable. This requires that an up or down force must be applied to the handle of cart, while simultaneously pulling on the handle, depending on which side of the junction of the "L" has more weight.

On the market, there are heavy duty versions of folding carts of this type, which can be used for larger and heavier loads, which are more stable, and therefore easier to pull. However, this is accomplished by making the cart larger and heavier, and therefore less compact and portable; to hand carry.

Small wheels make the cart more compact when folded, and lower the center of gravity of the cart, making it more stable. However, small wheels have more friction than large wheels, and are more difficult to pull, especially with a heavy load, and when going up or down sidewalk curbs and stairs.

While larger wheels make the cart easier to pull, and to go up or down sidewalk curbs and stairs, and less effected by ground conditions; they also make for a higher center of gravity of the cart, making the cart easier to overturn, and less compact when folded.

In summing up this basic type of cart; it is small and compact, but its performance leaves much room for improvement.

The other basic type of folding cart on the market today, is the type used mostly for shopping. It is much larger than the first basic type previously mentioned, and consists, when opened, of a rectangular enclosure, with an open top and the rear of the enclosure extended upwards to form a handle. Two wheels are placed at each rear bottom end of the enclosure, and sometimes, two smaller wheels are added at the front bottom ends of the enclosure.

Typical dimensions of one of the larger type folding cart of this type are as follows: an enclosure of 15" front to back; 18" wide; and 22" high; with the extended rear of the enclosure 35" high to form a handle; use of $10\frac{1}{2}$" diameter rear wheels lifts the enclosure 6" off the ground, making the handle 41" high; the rear wheels are 22" apart, while the 6" diameter front wheels are 16" apart.

When folded, the cart is 45" high, 2" wide, except at the bottom where it is 15" wide because of the four wheels. The cart weighs about 22 lbs.

This type of folding cart, with 2 wheels, has a few performance advantages when compared to the first type of folding cart, previously mentioned. Having a wider distance between the larger wheels makes the cart more stable, and less effected by ground conditions. There is no problem with anything in the enclosure falling out of the cart, and it is easier to pull, although the problem with unbalanced loads still exists, and it is still necessary to either push down or lift up on the handle, while simultaneously pulling the cart.

This type of cart with four wheels, has all the above advantages of the two wheel model, plus a few more. Having four wheels, this cart can also be pushed as well as pulled. Pushing a four wheel cart is easier, since there is no problem with balancing the load.

The cart also is very much easier to use to go up or down sidewalk curbs or stairs, since the handle and front wheels can be used as a fulcrum to lift or lower the cart.

The main disadvantage of the four wheel cart, is that it is very difficult to maneuver with all four wheels on the ground, especially with a heavy load, since the wheels have a tendency to move best in a straight line, if perfectly aligned, which is very rarely the case. Usually, because of misalignment caused by uneven wear of the wheels, these carts tend to veer to one side, and the only way to change direction is to lift the front wheels of the cart off the ground and balance the cart on its rear wheels.

In summing up this second type of folding cart; it has many performance advantages over the first basic type previously mentioned, but because it is larger and heavier, it can hardly be considered as being compact, and use as a hand carried cart is impractical. A further limitation is that by using an enclosure, there is a size limitation imposed, and only objects that can fit in the enclosure can be carried, regardless if these objects do not weigh very much.

There is also a third basic type of folding cart on the market today, which enjoys very limited success because of its poor performance characteristics. This type consists of a non regid, cloth like enclosure, attached to a regid platform with wheels, at its bottom. However, this type is very difficult to use, since it must be pushed or pulled along by its top handles, or pulled by a strap, which makes it very difficult to go up or down sidewalk curbs, or steps, which can be best accomplished by lifting the whole cart. Further, the size of the load is limited by the size of the non regid enclosure.

SUMMARY OF THE INVENTION

The object of this invention is to provide a unique folding cart that makes very efficient use of its folded volume, so that it can be made small enough to be hand carried, yet can be unfolded into a four wheeled cart having the performance characteristics and advantages of a large cart.

A simplified view of the folding cart invention of this patent can be seen in FIG. 10.

Since it has no sides, large packages can be carried by it. Since it has four equal sized wheels which all swivel, it is much easier to maneuver, even with all four wheels on the ground, and almost 90 degree turns can be made with it. It can just as easily be pulled or pushed, and having four wheels, each of which can be locked in one of four positions, it can easily be used to go up or down steps and sidewalk curbs.

Since the load is essentially distributed evenly between four identical wheels, the cart is perfectly balanced at all times. If necessary, for larger loads, the cart can be used with only one handle, the load is tied to the cart by the common type of rubber ties available, or by any other conventional means. For added stability with this type load, the wheels are mounted on slides that can be used to place the wheels further away from the body, and thereby increase the distance between wheels.

The above, and more, will become apparent, as the invention is further explained in detail.

Please note that the figure drawings found in this patent have been exaggerated for clarity, and in some cases, also simplified for clarity, and they are shown by way of example only, and are not to be construded as limiting the scope of this invention in any manner.

GENERAL NOTES ABOUT THE DRAWINGS

Before the figure drawings are explained, some general prior information will be provided to make said understanding easier.

FIG. 10 is an overly simplified view of the basic unfolded cart, to give a very general idea of the invention.

FIGS. 1, 2, 4, 6, and 10 show the invention in the unfolded condition, while FIGS. 3, 5, 7, 8, and 9 show the invention in the folded condition.

FIG. 1 is a top view of the invention in the unfolded condition. Please note that the invention is symmetrical with respect to line 2—2; with what is shown above line 2—2 being the mirror image of what is shown below line 2—2.

There is no such symmetry with respect to a vertical line drawn through the center of FIG. 1, which is perpendicular to line 2—2, and therefore, the left and right side view of FIGS. 1 are similar, but not identical.

Although the invention uses two handles, a left handle (6); and a right handle (7), which move independently of each other, and are similar, they are not identical and that is the reason for different reference numbers.

In a similar manner, the left handle posts (8) and the right handle posts (28) are not identical.

However, the four handle positioning slides (16) used with the left handle (6) and the right handle (7) are identical, and have the same reference number.

Also, the left hinge assemblies (2) and the right hinge assemblies (20) are similar, but not identical.

All four wheel assemblies (1) are identical and are of the swivel type. In every figure which shows the cart to be in the unfolded condition, (FIGS. 1, 2, 4, 6, and 10), all the wheels are shown as being in the same position, as if the folding cart was being pushed or pulled in a direction going to the right in FIG. 1.

In drawings where the cart is shown in the folded condition, (FIGS. 3, 7, and 8), the two wheel assemblies (1) shown at the left side of FIG. 1, have been rotated 180 degrees, before being placed in the horizontal position, so that they will not stick out.

The above should make it easier to understand the following.

BRIEF DESCRIPTION OF THE DRAWINGS

Further advantages of the invention will become apparent from a reading of the following specification describing illustrative embodiments of the invention. This specification is to be taken accompanying drawings in which:

FIG. 2 is a cross-sectional view taken along line 2—2 of FIG. 1;

FIG. 3 is a view of FIG. 2, but with the invention placed in the folded condition;

FIG. 4 is a right side view of the invention, as shown in FIG. 1, with the left handle (6), left handle posts (9), the handle positioning slides (16) which are mounted on the left handle (6), and the left hinge guide (17), not shown for clarity, since all above would appear as invisible lines, and can be clearly seen best in FIG. 6.

FIG. 5 is a view of FIG. 4, below line X—X, with the invention placed in the folded condition. Above line X—X in FIG. 4, the view is identical with the invention in the folded or unfolded condition, except that the right handle (7) would be in the horizontal position, as best shown in the top view in FIG. 9;

FIG. 6 is a left side view of the invention as shown in FIG. 1, with the right handle (7), right handle posts (28), the handle positioning slides (16) which are mounted on the right handle (7), and the right hinge guides (18), not shown for clarity, since all of the above would appear as invisible lines, and can be clearly seen best in FIG. 4;

FIG. 7 is a view of FIG. 6, below line Y—Y, with the invention placed in the folded condition. Above line Y—Y in FIG. 4, the view is identical with the invention in the folded or unfolded condition, except that the left handle (6) would be in the horizontal position, as best shown in the top view of FIG. 9;

FIG. 8 is a simplified bottom view of the invention as shown in FIG. 1, but with the invention rotated 180 degrees with line 2—2 as the axis, and with the invention placed in the folded condition;

FIG. 9 is a simplified view of the invention as shown on FIG. 1, but with the invention placed in the folded condition;

FIG. 10 is a simplified view of one basic embodiment of the invention;

FIG. 11 shows a simplified fragmented side view (top drawing), and a simplified fragmented top view (bottom drawing) of a hinge spring (19), wrapped around a hinge pin (34), of a hinge in the open (180 degree) position, to illustrate a hinge loaded by a spring;

FIG. 12 shows two side views (two left drawings) and two front views (two right drawings), of a locking bracket (33) in the locked position (two top drawings), and in the unlocked position (two bottom drawings). With the locking bracket (33) in the unlocked position (bottom left drawing), it can be seen that the wheel assembly (1) can swivel with the wheel assembly swivel pin (23) as an axis. When the locking plate (29) of the locking bracket (33) (bottom right drawing) is lifted up and moved to the right (top right drawing), the locking plate (29), which is held in place by locking plate studs (30), is placed in a position that prevents the wheel assembly (1) (top left drawing) from swiveling;

FIG. 13 shows an alternative, manual method of placing a wheel assembly (1) (not shown) in either a vertical or horizontal position, by means of a plate mounting bracket (25), shown best in FIG. 14, and attached to a bracket assembly (27);

FIG. 14 (left drawing) shows a plate mounting bracket (25) into which a plate (26) fits, when moved in the direction of the arrow. Any type of wheel assembly, such as the wheel assembly (1) can be mounted to the bottom middle of the plate (26). The mounting bracket (25) is shown with a shallow opening into which the plate (26) only partially fits, to show that when the invention is in the folded condition, and the wheel assembly (1) is in the horizontal position, such as shown in FIGS. 5 and 7, where there is no load placed on the wheel assembly (1), then it is not necessary to use a full insertion bracket. When the wheel assembly (1) is to to be placed in the horizontal position when the invention is in the folded position, the vertical mounted bracket (locking bracket 25) of FIG. 13 is used; while when the wheel assembly (1) is to be placed in the vertical position, when the invention is in the unfolded position, then the horizontally mounted locking bracket (25) of FIG. 13 is used.

Figure 1:
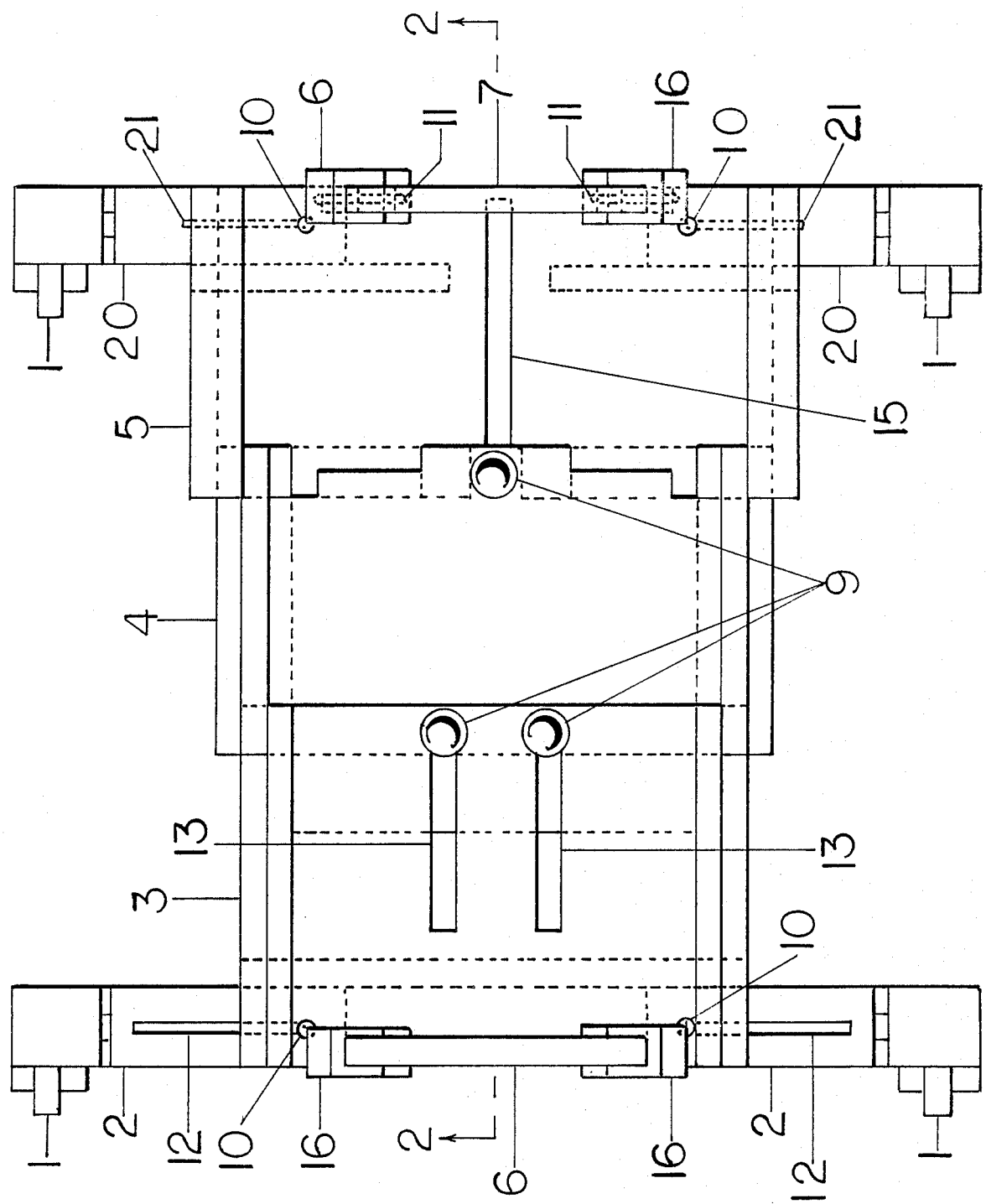
FIG. 1 is a top view of the invention, in the unfolded condition.

Please note that the bracket assembly (27) can be used in place of the left hinge assembly (2) as shown in FIG. 6, or the right hinge assembly (20) as shown in FIG. 4.

DESCRIPTION OF THE PREFERRED EMBODIMENTS

Referring now specifically to the drawings, in which identical parts are designated by the same reference numerals throughout.

FULL DESCRIPTION OF THE LEFT HANDLE (6) AND THE RIGHT HANDLE (7)

FIG. 1 shows a top view of the folding cart invention in the unfolded condition;

FIG. 9 shows a top view of the invention in the folded condition, showing the left handle (6) and the right handle (7) in the folded horizontal position, with the left handle (6) resting on the top of the right handle (7) with their associated handle positioning slides (16); while FIG. 1 shows the left handle (6) and the right handle (7) in the vertical position, being held in said position by their associated handle positioning slides (16);

FIG. 4 shows that the right handle (7) is held in place by four right handle posts (28) and a handle pin (11). To place the right handle (7) from the folded position (horizontal) to the unfolded position (vertical), the right handle (7) is lifted into the vertical position and the handle positioning slides (16) are allowed to slide down the right handle (7) as shown by the handle positioning slide (16) at the right side of FIG. 4, fitting snugly over the tops of the two right handle posts (28), and the handle pin (11), and holding the right handle (7) in the upright vertical position, as shown best by FIG. 6. In a similar manner, the left handle (6) is held in place by four left handle posts (8) and a handle pin (11), and kept in the vertical position by two handle positioning slides (16).

FULL DESCRIPTION OF THE REST OF THE INVENTION

FIG. 1 shows a top view of the invention in the unfolded condition; which consists of three telescoping panel sections; a left end panel (3), a middle panel (4), and a right end panel (5); with the left handle (6) having associated handle positioning slides (16) and mounted on the left end panel (3), while the right handle (7) has associated handle positioning slides (16) and mounted on the right end panel (5). The left end panel (3) has two left end panel slots (13), while the right end panel (5) has a single right end panel slot (15). The bottom panel upper parts (9) of the bottom panel (22) (not shown); fit through the middle panel holes (14) (shown best by FIG. 2), and not shown in FIG. 1, through the two left end panel slots (13) and the right end panel slot (15) to to respectively hold the left end panel (3) and the middle panel (4) and the middle panel (4) and the right end panel (5), together; and allow the invention to be placed in the folded and unfolded conditions. Further shown, is that a wheel assembly (1) is mounted at one end of each of two left hinge assemblies (2); with each left hinge assembly (2) mounted to the left end panel (3) by means of a stud (10) through the left hinge slot (12), which permits each left hinge assembly (2) to slide along the length of its left hinge slot (12), out away from one end of the left end panel (3), when the invention is placed in the unfolded condition. A left hinge guide (17), not shown in FIG. 1, but best shown in FIG. 2, allows each left hinge assembly (2) to move in a straight line direction parallel to the left side of the left end panel (3). In a similar manner, a wheel assembly (1) is attached to one end of each of the two right hinge assemblies (20), and attached to the right end panel (5) by a stud (10); and two right hinge guides (18) allow straight line movement of the associated right hinge assembly (20). When the invention is placed in the folded condition, the two left hinge assemblies (2) and the two right hinge assemblies (20) are placed in their unextended positions and the wheel assemblies (1) are folded 90 degrees and best shown by FIG. 5 (right hinge assembly 20) and FIG. 7 (left hinge assembly 2), and are held in place against the bottom panel (22) by spring tension of the left hinge assembly (2) and the right hinge assembly (20).

FIG. 2 is a cut a way front view of the invention along line 2—2 of FIG. 1. For clarity, the left handle (6) and the right handle (7) are shown in the vertical position, but without the handle positioning slides (16) of FIG. 1 and FIG. 9, to better show the location of the left handle post (8) and its associated handle pin (11), and in a similar manner; is shown the right handle (7) with its associated right handle post (28) and handle pin (11). Shown are the left end panel (3), middle panel (4), and the right end panel (5), which form the body of the invention. The left hinge guide (17) is shown attached to the left bottom end of the left end panel (3), the left hinge assembly (2) with its associated wheel assembly (1) is attached to the bottom of the left hinge guide (17) by means of a stud (10). The bottom panel (22) with its bottom panel upper parts (9); is shown holding the left end panel (3) and the middle panel (4) and the middle panel (4) and the right end panel (5) together, and allows the invention to be placed in the folded and unfolded condition. A right hinge guide (18) is shown attached to the bottom right end of the right end panel (5), with the right hinge assembly (20) and its associated attached wheel assembly (1); is attached to the left bottom end of the left end panel (5) by means of a stud (10) through the right hinge slot (21). The wheel assemblies (1) have a wheel assembly swivel pin (23) which is the swivel axis around which the wheel assembly (1) swivels.

FIG. 3, the same side view of the invention shown in FIG. 2, but with the invention placed in the folded condition; accomplished by pushing the left end panel (3) and the right end panel (5) towards each other; as best shown by the straight arrows of FIG. 2; then pushing the two right hinge assemblies (2) towards each other, as shown by the arrows of FIG. 4, after placing their associated wheel assemblies (1) in the horizontal position to reach the position best shown in FIG. 5; then pushing the two left hinge assemblies (2) towards each other, as shown by the arrows of FIG. 6, after placing their associated wheel assemblies (1) in the horizontal position to reach the position best shown in FIG. 7. All the handle positioning slides (16) (not shown for clarity) are lifted up, to the position best shown by the handle positioning slide (16) at the right side of FIG. 4, and the left handle (6) and the right handle (7) are pushed down, as best shown by the semicircular arrows of FIG. 2 to the position shown in FIG. 3, with the left handle (6) being placed on top of the right handle (7), as best shown by FIG. 9.

FIG. 4 is a right side view of the invention, as shown in FIG. 1, with the left handle (6) and its two associated handle positioning slides (16), the four left handle posts (8), the two left hinge assemblies (2) with their associated wheel assemblies (1), almost all of which would appear as invisible lines, are not shown for clarity; and with them being shown best by a left side view of the invention as shown in FIG. 1, by FIG. 6. Shown are the two right hinge assemblies (20), held in place by studs (10), and having associated wheel assemblies (1) with wheel assemblies swivel pins (23). The four right handle posts (28) are shown attached to the right end panel (5). The right handle (7) is shown in vertical position, with the handle positioning slide slide (16) at the right, shown in the position just prior to being placed in position shown by the handle positioning slide (16) at the left, in order to hold the right handle (7) in the vertical position. Also shown, is the bottom panel upper parts (9) of the bottom panel (22) and how it holds the left end panel (3) and the middle panel (4) and the middle panel (4) and the right end panel (5) together. To place the invention in the folded condition, the two wheel assemblies (1) are folded in the direction shown by the semicircular arrows, and then the two right hinge assemblies (20) are pushed in the direction of the straight arrows to the position shown in FIG. 5.

FIG. 5 shows the view of FIG. 4, below line X—X, but with the invention placed in the folded condition; with the two right hinge assemblies (20), with their associated wheel assemblies (1) folded and held in place against the bottom panel (22) by spring tension.

FIG. 6 is a left side view of the invention as shown in FIG. 1. The right handle (7), and its two associated handle positioning slides (16), the four right handle posts (28), the two right hinge assemblies (20) with their associated wheel assemblies (1), and the right hinge guides (18), almost all of which would appear as invisible lines, are not shown for clarity; and can be best seen in a right side view of the invention as shown in FIG. 1, by FIG. 4. FIG. 6 shows the two left hinge assemblies (2) and left hinge guide (17) and their two associated wheel assemblies (1), held in place by studs (10), and having wheel assembly swivel pins (23). The four left handle posts (8) are shown attached to the left end panel (3). The left handle (6) is shown in the vertical position, held in place by two handle positioning slides (16). Also shown, is the bottom panel upper parts (9) of the bottom panel (22), holding the left end panel (3) and the middle panel (4), and the middle panel (4) and the right end panel (5) together. To place the invention in the folded condition, the two wheel assemblies (1) are folded in the direction shown by the semicircular arrows, and then pushed in the direction of the straight arrows, to the position shown in FIG. 7.

FIG. 7 shows the same view of FIG. 6, below line Y—Y, but with the invention placed in the folded condition, and the two left hinge assemblies (2) with their associated wheel assemblies (1) folded, and held in place against the bottom panel (22).

FIG. 8 is a simplified bottom view of the invention as shown in FIG. 1, but with the invention rotated 180 degrees with line 2—2 as an axis, and placed in the folded condition. Shown are the four wheel assemblies (1) in the folded (horizontal) position; which are attached to the left hinge assembly (2) attached to the left end panel (3), and the right hinge assembly (20) attached to the right end panel (not shown), and are held in place by the bottom panel (22).

FIG. 9 is a view of the invention shown in FIG. 1, but with the invention placed in the folded condition. Shown is the left handle (6), held in place by the four left handle posts (8) and two handle pins (11); with its associated handle positioning slides (16), folded into the horizontal position and resting on top of the similarly folded right handle (7), held in place by four right handle posts (28) and two handle pins (11), with its associated handle positioning slides (16). The left handle posts (8) are attached to the left end panel (3), while the right handle posts (28) are attached to the right end panel (5). Also shown are the left end panel slots (13) and the four studs (10) which hold the left hinge assembly (2) (not shown), and the right hinge assembly (20) (not shown), in place. The bottom panel upper parts (9) are shown holding the left end panel (3) and the middle panel (4), and the middle panel (4) and the right end panel (5), together, and allow the invention to be placed in the folded and unfolded conditions.

It is to be understood that the foregoing description of the various embodiments illustrated therein is exemplary and various modifications to the embodiments shown herein may be made without departing from the spirit and scope of this invention.

What is claimed is:

1. A folding cart, consisting of a rectangular folding body having a left end panel with two rectangular lengthwise slots, a middle panel with two holes at one end and one hole at the opposite end, and a right end panel with one rectangular lengthwise slot; each of said panels having interlocking side rails at two opposite ends, parallel to said slots, and are held together by studs, through each of said two slots of said left end panel and said two holes at said one end of said middle panel, and by said stud through said remaining hole of said middle panel and said slot of said right end panel, allowing said body to be placed in the folded and unfolded position; a handle assembly attached to the top outer ends of said left and right end panels, means for locking said handle assemblies in a vertical position; wheel assemblies attached to each bottom corner of said body, releasable locking means for locking said wheel assemblies in either a vertical or a horizontal position; means for extending said wheel assemblies away from said body; when said cart is placed in the unfolded condition, said handle and wheel assemblies can be locked in said vertical positions; with the ground contact part of said wheel assemblies resting on the ground; when said cart is placed in the folded condition, said handle and wheel assemblies can be locked in said horizontal positions.

2. A folding cart, consisting of a generally rectangular body having interlocking parts, means for holding said parts together and to limit the amount of travel of said parts when said cart is placed in the folded and unfolded position; a handle assembly attached to the top left end of said body, and a said handle assembly attached to the top right end of said body; means for locking said handle assemblies in a vertical position; wheel assemblies attached to each bottom corner of said body; means for extending said wheel assemblies away from said body releasable locking means for locking said wheel assemblies in the vertical position and means for locking said wheel assembly in the horizontal position, said means for locking said wheel assembly in the horizontal position including a plate means for holding the wheel assemblies in their horizontal position by engaging below the wheel assemblies only when the wheel assemblies are in the non extended position.

3. A folding cart, consisting of a generally rectangular body having parts with interlocking rails; said rails having means for holding said parts together, and to limit the amount of travel of said parts when said cart is placed in the folded and unfolded position; a handle assembly attached to the top right end of said body, and a said handle assembly attached to the top left end of said body; means for locking said handle assemblies in a vertical position; wheel assemblies attached to each bottom corner of said body; means for extending said wheel assemblies away from said body releasable locking means for locking said wheel assemblies in the vertical position and means for locking said wheel assembly in the horizontal position, said means for locking said wheel assembly in the horizontal position including a plate means for holding the wheel assemblies in their horizontal position by engaging below the wheel assemblies only when the wheel assemblies are in the non extended position.

4. A folding cart as defined in claim 1, wherein said releasable locking means for locking said handle assembly in said vertical position, is a handle positioning slide, the top part of which fits around the handle of said handle assembly, and can slide along said handle, while the bottom part fits snugly around the parts that said handle is attached to.

5. A folding cart as defined in claim 4, with the addition of releasable locking means for locking said wheel assemblies in four fixed positions 90 degrees apart.

6. A folding cart as defined in claim 2, wherein said releasable locking means for locking said handle assembly in said vertical position, is a handle positioning slide, the top part of which fits around the handle of said handle assembly, and can slide along said handle, while the bottom part fits snugly around the parts that said handle is attached to.

7. A folding cart as defined in claim 6, with the addition of releasable locking means for locking said wheel assemblies in four fixed positions 90 degrees apart.

8. A folding cart as defined in claim 3, wherein said releasable locking means for locking said handle assembly in said vertical position, is a handle positioning slide, the top part of which fits around the handle of said handle assembly, and can slide along said handle, while the bottom part fits snugly around the parts that said handle is attached to.

9. A folding cart as defined in claim 8, with the addition of releasable locking means for locking said wheel assemblies in four fixed positions 90 degrees apart.

* * * * *